(12) United States Patent
Tanaka et al.

(10) Patent No.: US 7,439,283 B2
(45) Date of Patent: Oct. 21, 2008

(54) FLAME RETARDANT RESIN COMPOSITION AND FLAME-RETARDANT INJECTION-MOLDING

(75) Inventors: Kazuya Tanaka, Shiga (JP); Jun Takagi, Shiga (JP); Shinichiro Yamada, Tokyo (JP); Hiroyuki Mori, Tokyo (JP); Yuko Fujihira, Tokyo (JP)

(73) Assignees: Mitsubishi Plastics, Inc., Tokyo (JP); Sony Corporation, Tokyo (JP)

( * ) Notice: Subject to any disclaimer, the term of this patent is extended or adjusted under 35 U.S.C. 154(b) by 339 days.

(21) Appl. No.: 10/526,495

(22) PCT Filed: Sep. 8, 2003

(86) PCT No.: PCT/JP03/11454

§ 371 (c)(1),
(2), (4) Date: Sep. 20, 2005

(87) PCT Pub. No.: WO2004/022650

PCT Pub. Date: Mar. 18, 2004

(65) Prior Publication Data

US 2006/0100313 A1 May 11, 2006

(30) Foreign Application Priority Data

Sep. 6, 2002 (JP) .............................. 2002-261673

(51) Int. Cl.
*C08K 9/10* (2006.01)
(52) U.S. Cl. ..................... 523/205; 523/210; 523/212; 523/216

(58) Field of Classification Search .................. 523/205, 523/210, 212, 216
See application file for complete search history.

(56) References Cited

U.S. PATENT DOCUMENTS

| 5,264,030 | A | | 11/1993 | Tanabe et al. | |
| 5,412,017 | A | | 5/1995 | Gareiss et al. | |
| 5,916,950 | A | * | 6/1999 | Obuchi et al. | 524/492 |
| 2006/0194899 | A1 | * | 8/2006 | Ohashi et al. | 523/200 |
| 2007/0142503 | A1 | * | 6/2007 | Yamada et al. | 523/212 |
| 2007/0203287 | A1 | * | 8/2007 | Tanaka et al. | 524/556 |

FOREIGN PATENT DOCUMENTS

| EP | 0 509 365 | | 10/1992 |
| EP | 0 621 304 | | 10/1994 |
| GB | 2 315 453 | | 2/1998 |
| JP | 7-207041 | | 8/1995 |
| JP | 7-308961 | | 11/1995 |
| JP | 8-252823 | | 10/1996 |
| JP | 10-098946 | * | 4/1998 |
| JP | 2002-105298 | | 4/2002 |

* cited by examiner

*Primary Examiner*—Peter Szekely
(74) *Attorney, Agent, or Firm*—Wenderoth, Lind & Ponack, L.L.P.

(57) ABSTRACT

In order to provide a resin composition containing a lactic acid resin, and a molded article obtained from this resin composition which impart flame retardance to the resin composition and suppress a reduction in the molecular weight, use is made of a flame-retardant resin composition which contains a resin composition of which the major component is a lactic acid resin, and a surface-treated metallic hydroxide, wherein the surface-treated metallic hydroxide is added by 50-150 parts by mass per 100 parts by mass of the lactic acid resin.

13 Claims, 1 Drawing Sheet

FLAME RETARDANT RESIN COMPOSITION AND FLAME-RETARDANT INJECTION-MOLDING

TECHNICAL FIELD

The present invention relates to a flame-retardant resin composition and a flame-retardant injection molded article formed by injection-molding this composition.

BACKGROUND ART

Due to their excellent formability and favorable physical properties, plastics are used for a vast variety of goods including packaging materials, other articles of daily use, agricultural and civil engineering materials, and parts for household appliances and automobiles. However, plastics are now posing grave social problems because they are produced from petroleum, one of the natural resources of which the underground reserves are limited, and because used plastic products are difficult to dispose of.

Therefore, uses of biodegradable plastics, i.e. plastics derived from vegetables, which are free of these problems, are rapidly increasing these days. A typical such plastic is polylactic acid, which is a plastic obtained by polymerizing lactates, which are in turn obtained by fermenting corns or sugar beets.

While such polylactic acid is widely used for materials for nondurable consumer goods such as packaging materials and other daily necessities (see for example the below-identified References 1 and 2), it has been used for very few durable goods, such as parts of household appliances and automobiles, for which extremely high durability is required.

This is because neither polylactic acid itself nor any existing composition containing polylactic acid has flame retardancy enough to clear the lower limit values set under JIS (Japanese Industrial Standards) or UL (Underwriters' Laboratories) for parts of household appliances and automobiles.

However, the below-identified Reference 3 discloses a resin comprising a biodegradable plastic to which is added aluminum hydroxide powder or magnesium hydroxide powder to cause the biodegradable plastic to have flame retardancy.

Reference 1: JP patent publication 7-207041

Reference 2: JP patent publication 7-308961

Reference 3: JP patent publication 8-252823

But if the biodegradable plastic used in Reference 3 is an aliphatic polyester such as polylactic acid, a hydroxide such as aluminum hydroxide or magnesium hydroxide that is added to this biodegradable plastic tends to hydrolyze the biodegradable plastic especially during melt compounding or melt forming, thus markedly lowering the molecular weight of the resin. This in turn aggravates various physical properties, such as strength, of the resin composition or molded article obtained to such an extent that these resin composition and molded article are practically useless.

An object of the invention is therefore to provide a resin composition containing a lactic acid resin and having enough flame retardancy as well as a sufficiently large molecular weight, and an article formed by molding this composition.

The present invention provides a flame-retardant resin composition comprising a resin composition mainly comprising 100 parts by mass of a lactic acid resin, and 50-150 parts by mass of a surface-treated metallic hydroxide.

Since the metallic hydroxide is surface-treated, it will not directly contact the resin composition when mixed with the resin composition. This suppresses hydrolysis of the resin composition and thus the lowering of its molecular weight.

Addition of the surface-treated metallic hydroxide in the above-defined amount will cause the resin composition to have sufficient flame retardancy.

Thus, the injection-molded article according to the invention has sufficiently high flame retardancy, shock resistance and heat resistance, while substantially keeping the biodegradability of the lactic acid resin intact. Also, since the resin composition is scarcely hydrolyzed, its molecular weight is kept high.

By further adding a carbodiimide compound to this composition, the molecular weight of the injection-molded article will scarcely decrease even if it is actually used in a harsh environment such as a high-humidity, high-temperature environment.

By further adding an inorganic filler to the composition, dimensional stability of the flame-retardant injection-molded article according to the invention will improve.

BEST MODE FOR EMBODYING THE INVENTION

Figure 1A:
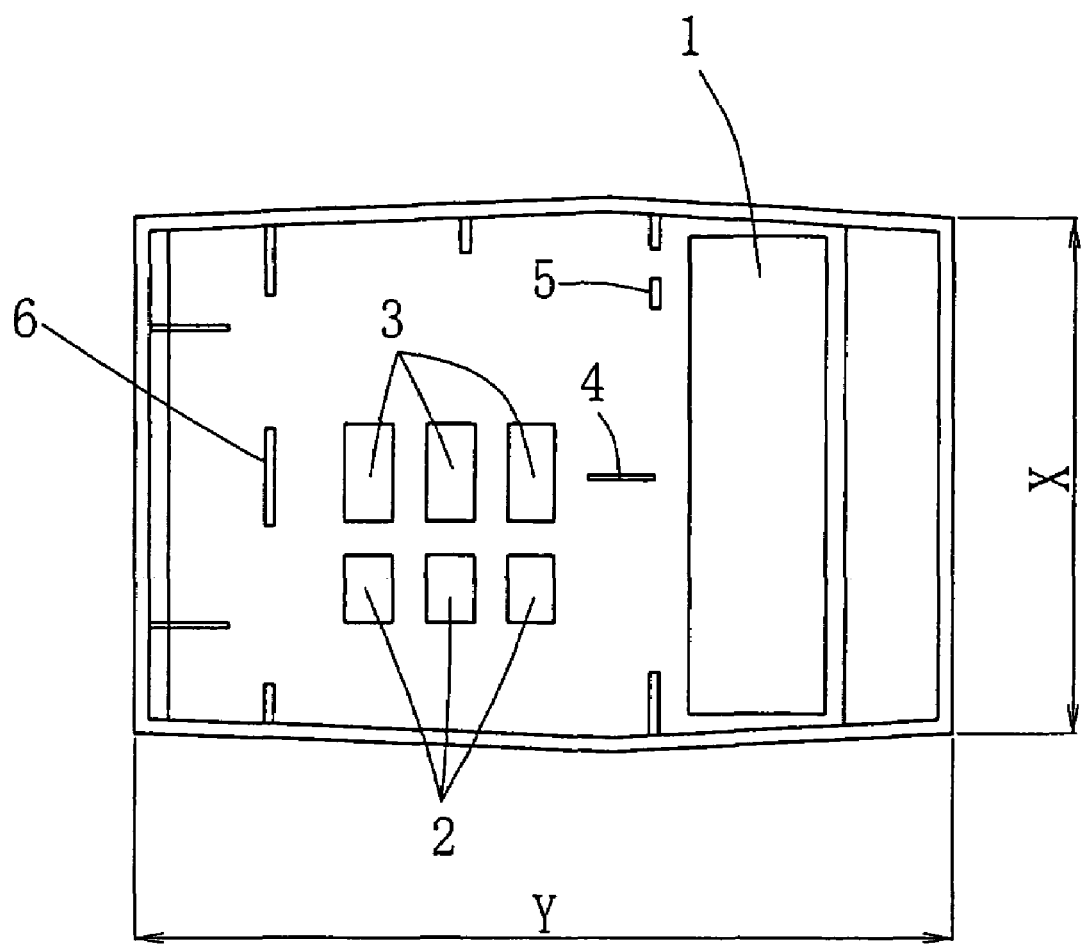
FIG. 1A is a plan view of an injection-molded article prepared both as an example embodying the invention and a comparative example and subjected to a dimensional stability test.

The invention is now described in more detail.

The flame-retardant resin composition according to the present invention comprises a resin composition mainly comprising a lactic acid, and a surface-treated metallic hydroxide.

As used herein, the lactic acid resin refers to poly(L-lactic acid), of which the structural units are L-lactic acid, poly(D-lactic acid), of which the structural units are D-lactic acid, poly(DL-lactic acid), of which the structural units are D-lactic acid and L-lactic acid, a mixture thereof, and a copolymer of L-lactic acid and/or D-lactic acid with α-hydroxycarbonic acid or diol and dicarboxylic acid.

The L/D ratio in the lactic acid resin is preferably 100:0 to 90:10 or 0:100 to 10:90, more preferably 100:0 to 94:6 or 0:100 to 6:94. Outside this range, the heat resistance of the injection-molded article obtained by injection-molding the resin composition tends to be insufficient. This may limit the use of such an article.

The content of the L-lactic acid and/or D-lactic acid in the copolymer is not particularly limited, but preferably not less than 50 percent by weight, because if the content is less than 50 percent by weight, the properties of the components in the copolymer other than the polylatic acid will reveal themselves more strongly than the properties of the polylactic acid.

Typically, the poly(L-lactic acid), poly(D-lactic acid) and/or poly(DL-lactic acid) may be LACTY series made by SHIMADZU SEISAKUSHO, Lacea series made by Mitsui Chemical, and Nature Works series of Cargill Dow LLC.

Other hydroxy-carboxylic acid units used in the copolymer may be bifunctional aliphatic hydroxyl-carboxylic acids such as glycolic acid, 3-hydroxybutyric acid, 4-hydroxybutyric acid, 2-hydroxy-n-butyric acid, 2-hydroxy-3,3-dimetyl butyrate, 2-hydroxy-3-methyl butyrate, 2-methyl butyrate, 2-hydroxycaproic acid, or lactones such as caprolactone, butyrolactone or valerolactone.

The aliphatic diol used in the copolymer may be ethylene glycol, 1,4-butanediol or 1,4-cyclohexanedimethanol. The aliphatic dicarboxylic acid used in the copolymer may be succinic acid, adipic acid, suberic acid, sebacic acid, or dodecandioic acid.

The lactic acid resin may be polymerized by condensation polymerization or ring-opening polymerization or any other known polymerization method. For example, in condensation polymerization, monomer materials such as L-lactic acid or D-lactic acid, or a mixture of such monomer materials is directly subjected to dehydro-condensation polymerization to obtain a lactic acid resin having a desired composition.

In ring-opening polymerization, a polylactic acid polymer is obtained from lactides, which are cyclic dimers of lactic acids, using a selected catalyst and optionally a polymerization regulator. Such lactides include L-lactide, which is a dimer of L-lactic acid, D-lactide, which is a dimer of D-lactic acid, and DL lactide, which comprises L-lactic acid and D-lactic acid. A lactic acid resin having a desired composition and crystallinity is obtained by combining and polymerizing necessary ones of these lactides.

In order to improve e.g. the heat resistance, small amounts of non-aliphatic dicarboxylic acids such as terephthalic acid and/or non-aliphatic diols such as ethylene oxide adducts of bisphenol A may be further added to the copolymer.

In order to increase the molecular weight, small amounts of chain extenders such as diisocyanate compounds, epoxy compounds or acid anhydrides may be further added to the copolymer.

Preferably, the lactic acid resin has a weight-average molecular weight in the range of between 50000 and 400000, more preferably between 100000 and 250000. Below this range, the composition will reveal practically no practical physical properties. Above this range, the melt viscosity will be so high as to deteriorate moldability.

The resin composition according to the invention is a composition of which the major component is a lactic acid resin of the above-described type. The content of the lactic acid resin is 50 to 100 percent by weight because if its content is less than 50 percent by weight, it cannot be a major component. The resin composition may consist only of the lactic acid resin. That is, the content of the lactic acid resin in the resin composition may be 100 percent by weight.

Besides the above-defined lactic acid resin, the resin composition may contain a resin or resins other than lactic acid resins. That is, the resin composition may be a mixture of the lactic acid resin and a resin or resins other than lactic acid resins.

Such other resins include aliphatic polyesters or aromatic aliphatic polyesters other than lactic acid resins having a glass transition temperature (Tg in short) not exceeding 0 degrees Celsius, and a crystalline melting temperature (Tm in short) of not less than 100 degrees Celsius (these polyesters are hereinafter referred to as "aliphatic or other polyesters 1"), and aliphatic or aromatic aliphatic polyesters other than lactic acid resins of which the Tg is not more than 0 degrees Celsius, and the Tm is less than 100 degrees Celsius ("aliphatic or other polyesters 2").

Aliphatic or other polyesters 1 serve to prevent deformation of the flame-retardant resin composition according to the invention while the resin composition is being injection-molded or during heat treatment after injection molding, and also improve resistance to heat to which the injection-molded article may be subjected during practical use. Aliphatic or other polyesters 2 serve to improve the shock resistance of the above injection-molded article. According to the intended use of the injection-molded article, only polyesters 1, only polyesters 2 or both of them may be added to the lactic acid resin.

The content of polyesters 1 is preferably 20 to 60 parts by mass based on 100 parts by mass of the lactic acid resin. Below this range, polyesters 1 will scarcely improve the heat resistance during heat treatment. Above this range, polyesters 1 will lower the elasticity of the injection-molded article at normal temperature.

The content of polyesters 2 is preferably 10 to 60 parts by mass based on 100 parts by mass of the lactic acid resin. Below this range, polyesters 2 will not be able to sufficiently improve the shock resistance. Above this range, the injection-molded article will be so soft as to cause problems during heat treatment or during practical use.

Aliphatic polyesters other than lactic acid resins that can be used as polyesters 1 or 2 include aliphatic polyesters obtained by condensing aliphatic diols and aliphatic dicarboxylic acids, aliphatic polyesters obtained by subjecting cyclic lactones to ring-opening polymerization, and synthetic aliphatic polyesters. If these aliphatic polyesters are used as the polyesters 1 or 2, they have to have Tg and Tm values in the ranges defined above for polyesters 1 and 2.

Aliphatic polyesters obtained by condensing aliphatic diols and aliphatic dicarboxylic acids are obtained by condensing one or more of aliphatic diols such as ethylene glycol, 1,4-butanediol, and 1,4-cyclohexanedimethanol, and one or more of aliphatic dicarboxylic acids such as succinic acid, adipic acid, suberic acid, sebacic acid and dodecandioic acid. Aliphatic polyesters may be chain-extended using e.g. an isocyanate compound to obtain a desired polymer. Such an isocyanate compound may be Bionolle series made by Showa High Polymer Co., Ltd. and Enpole made by Irea Chemical Co., Ltd.

Aliphatic polyesters obtained by subjecting cyclic lactones to ring-opening polymerization are obtained by polymerizing one or more than one of cyclic monomers such as ε-caprolactone, δ-valerolactone and β-methyl-δ-valerolactone. Specific examples include CelGreen series made by Daicel Chemical Industries, Ltd.

Synthetic aliphatic polyesters are obtained by copolymerizing cyclic acid anhydrides such as succinic anhydride and oxiranes such as ethylene oxide or propylene oxide.

Aromatic aliphatic polyesters used as polyesters 1 or polyesters 2 may be biodegradable aromatic aliphatic polyesters comprising an aromatic dicarboxylic acid component, an aliphatic dicarboxylic acid component, and an aliphatic diol component. Such aromatic aliphatic polyesters have to have Tg and Tm values within the abovementioned predetermined ranges.

The aromatic dicarboxylic acid component used may be isophthalic acid, terephthalic acid, or 2,6-naphthalene dicarboxylic acid. The aliphatic dicarboxylic acid component used may be succinic acid, adipic acid, suberic acid, sebacic acid or dodecandioic acid. The aliphatic diol used may be ethylene glycol, 1,4-butanediol or 1,4-cyclohexane dimethanol. More than one kind of aromatic dicarboxylic acid component, aliphatic dicarboxylic acid component and/or aliphatic diol component may be used.

The most appropriate aromatic dicarboxylic acid component for the purpose of the invention is terephthalic acid, the most appropriate aliphatic dicarboxylic acid component is adipic acid, and the most suitable aliphatic diol is 1,4-butanediol.

While it is known that an aliphatic polyester comprising an aliphatic dicarboxylic acid and an aliphatic diol has biodegradability, in order for an aromatic aliphatic polyester to have biodegradability, it is necessary that aliphatic chains exist between the aromatic rings. Preferably, the content of the aromatic dicarboxylic acid component in the aromatic aliphatic polyester of the invention is not more than 50 mole percent.

Typical aromatic aliphatic polyesters include a copolymer of polybutylene adipate and terephthalate (Ecoflex made by BASF), and a copolymer of tetramethylene adipate and terephtahlate (Easter Bio made by Eastern Chemical).

According to the present invention, in order to impart flame retardance to the resin composition, a surface-treated metallic hydroxide is used. Conventional metallic hydroxides can also impart flame retardance to resin compositions similar to the one according to the invention. But such hydroxides tend to hydrolyze resin compositions mainly comprising polyesters, thereby lowering their molecular weights. In order to avoid this problem, according to the invention, the metallic hydroxide is subjected to surface treatment so that the metallic hydroxide will not directly contact the resin composition. This suppresses hydrolysis of the resin composition when the resin composition and the metallic hydroxide are kneaded together or when molding the flame-retardant resin composition, thereby curbing any reduction in the molecular weight of the resin composition. Surface treatment also serves to improve flame retardance of the composition, thus making it possible to reduce the content of the metallic hydroxide, which in turn checks worsening of physical properties, such as mechanical strength, of the composition.

Such surface treatment includes coating with a surface treating agent, in which a coating film of a surface treating agent is formed on the surface of a metallic hydroxide by immersion, dispersion, application, spraying or sol-gel coating of a surface treating agent, or its melt or solution, followed by drying. Alternatively, a coating film of a surface treating agent may be formed on the surfaced of the metallic hydroxide by immersion, dispersion, application, spraying or sol-gel coating of a precursor of a surface treating agent such as a polymerizable monomer, or its melt or solution, followed by polymerization and drying.

Surface treating agents used for this purpose include higher fatty acids, silane coupling agents, titanate coupling agents, silicone compounds, and synthetic resins.

Such fatty acids includes ones having a carbon number of 12 or over, such as lauric acid, myristic acid, palmitic acid, stearic acid, oleic acid, linoleic acid and linolenic acid.

Silicone compounds include silicone oil and silicone resin.

Synthetic resins usable for the above purpose include polyolefins such as polyethylene and polypropylene; polystyrene; and polyalkylmethacrylates such as polymethylmethacrylate.

The precursor of the surface treating agent used for the surface treatment is typically a polymerizable monomer, which may be propylene, styrene, or an alkylmethacrylate such as methylmethacrylate.

The metallic hydroxide used in the invention may be aluminum hydroxide, magnesium hydroxide, calcium/aluminate hydrate, tin oxide hydrate or Phlogopite.

In addition to the metallic hydroxide, a flame-retardant assistant may be added to further improve flame retardance. Such flame-retardant assistants include metallic compounds such as zinc stannate, zinc borate, iron nitrate, copper nitrate and sulfonic metallic salts, phosphorus compounds such as red phosphorus, polymeric phosphate ester and phosphazene compounds, PAN and silicone compounds. Among them, in view of the influence on the environment, zinc borate is particularly preferable.

The content of the thus surface-treated metallic hydroxide is preferably 50 to 150 parts by mass, more preferably 75 to 125 parts by mass, based on 100 parts by mass of the lactic acid resin in the resin composition. If its content is less than 50 parts by mass, the resin composition will show only insufficient flame retardance, and if higher than 150 parts by mass, the resin composition tends to suffer a reduction in the molecular weight as well as deterioration in the physical properties such as mechanical strength when the surface-treated metallic hydroxide and the resin composition are kneaded together or when injection-molding the flame-retardant resin composition.

The degree to which a decrease in the molecular weight of the flame-retardant resin composition according to the invention is suppressed is calculated from the decomposition rate of the resin composition, which is in turn calculated from the weight-average molecular weight of the resin composition (Mw) before the resin composition and the metallic hydroxide are kneaded together, and Mw after the flame-retardant resin composition has been injection-molded, using the following equation. This decomposition rate is preferably not more than 10%, preferably not more than 8%. If this rate is higher than 10%, the physical properties, such as mechanical strength, of the resin composition will begin to deteriorate. Ideally, the decomposition rate is 0%.

Decomposition rate (%)={(Mw before kneading)−(Mw after injection molding)}/(Mw before kneading)×100

The Mw values are measured by gel permeation chromatography (GPC) under the following conditions:

solvent used: chloroform; concentration of the solution: 0.2 wt %/vol %; amount of solution injected: 200 microliters; flow rate of the solvent: 1.0 ml/minute; temperature of the solvent: 40 degrees Celsius The weight-average molecular weight of the lactic acid resin is calculated in terms of the weight-average molecular weight of the polystyrene.

Besides the resin composition and the surface-treated metallic hydroxide, the flame-retardant resin composition according to the invention may further contain a carbodiimide compound in order for the flame-retardant resin composition to maintain a high molecular weight. That is, the carbodiimide compound is considered to react with carboxylic acid groups produced if the flame-retardant resin composition according to the invention or the article formed by injection-molding this resin composition is left in a high-temperature, high-humidity environment, and the resin composition is hydrolyzed, thereby extending chains, and thus maintaining the molecular weight of the resin composition. The carbodiimide compound also serves to maintain the molecular weight of the resin composition even if the injection-molded resin composition is actually used in a high-temperature, high-humidity environment.

The content of the carbodiimide compound is preferably 0.1 to 10 parts by mass, more preferably 0.5 to 8 parts by mass, based on 100 parts by mass of the flame-retardant resin composition. Below this range, the carbodiimide compound will be unable to sufficiently check the lowering of the molecular weight of the resin composition. Above this range, the carbodiimide compound tends to bleed out to such an extent as to mar the appearance of the article formed by injection-molding the flame-retardant resin composition and/or reduce the mechanical physical properties of the resin composition due to plasticization. Also, above this range, the carbodiimide compound may impair biodegradability and compositing speed of the flame-retardant resin composition.

The following formula (1) shows the basic structure of a typical such carbodiimide compound.

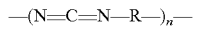

(where n is an integer equal to or greater than 1, R shows an organic bond unit which may be any of aliphatic, cycloaliphatic and aromatic ones)

Ordinarily, n is between 1 and 50.

Such carbodiimide compounds include bis(propylphenyl)carbodiimide, poly(4,4'-diphenylmethane carbodiimide), poly(p-phenylene carbodiimide), poly(m-phenylene carbodiimide), poly(tolylcarbodiimide), poly(diisopropylphenylene carbodiimide), poly(methyl-diisopropylphenylene carbodiimide), poly(triisopropylphenylene carbodiimide), monomers thereof, and combinations thereof.

In order to improve the dimensional stability when molding the resin composition, and to check shrinkage of the resin composition during heating and also shrinkage with the lapse of time, the flame-retardant resin composition according to the present invention may contain inorganic fillers besides the resin composition and the surface-treated metallic hydroxide.

Such inorganic fillers include talc, kaolin, calcium carbonate, bentonite, mica, sericite, glass flakes, graphite, magnesium hydroxide, aluminum hydroxide, antimony trioxide, barium sulfate, zinc borate, hydrated calcium borate, alumina, magnesia, wollastonite, Xonotlite, sepiolite, whiskers, glass fibers, metallic powder, beads, silica balloons, Shirasu balloons and organic balloons. The inorganic filler may have its surface treated with titanate, fatty acid or a silane coupling agent to increase the bond strength between the filler and the resin, thereby further enhancing the advantages of using the filler.

The flame-retardant resin composition according to the invention may further contain such additives as heat stabilizers, antioxidants, UV absorbers, light stabilizers, pigments, colorants, lubricants, nucleating agents and plasticizers, in such amounts that these additives will not mar the advantages of the present invention.

Description is now made of how the flame-retardant resin composition according to the present invention is injection-molded into an desired article.

The flame-retardant resin composition according to the invention is manufactured by putting the abovementioned material into a device which can knead them together, such as an injection molder or a twin-screw extruder, and mixing and kneading them therein. The thus produced flame-retardant resin composition is injection-molded into a desired article.

Specifically, raw materials for the flame-retardant resin composition may be directly put in an injection molder and injection-molded into a desired flame-retardant, injection-molded article. Alternatively, dry-blended raw materials may be first extruded from a twin-screw extruder into strand-shaped pellets, and the pellets may be supplied into an injection molder, optionally together with additional materials, and injection-molded into a desired flame-retardant, injection-molded article.

In either method, care must be taken to minimize decomposition of the materials, thereby minimizing lowering of the molecular weight of the resin composition. In order to evenly mix the materials, the latter method is preferable. That is, raw materials should be pelletized first.

In the latter method, the latic acid resin, the aliphatic polyesters 1 and 2 and other materials are sufficiently dried, i.e. dehydrated, melt-mixed together in a twin-screw extruder, and extruded therefrom into strand-shaped pellets. The melt extrusion temperature should be selected taking into consideration the facts that the melting point of the lactic acid resin varies with the ratio of the content of the L-lactic acid unit to the content of the D-lactic acid unit and that the melting point of the mixture of the resins varies with the contents of the resins forming the mixture. The melt extrusion temperature is usually in the range of 100 to 250 degrees Celsius.

The pellets thus manufactured are sufficiently dried or dehydrated, and after adding other materials if necessary, the pellets are injection-molded in the manner described below.

The flame-retardant, injection-molded article according to the present invention may be formed by any injection molding method, and is typically formed by general injection molding used in molding thermoplastic resins, by gas-assisted molding or by injection/compression molding. According to the intended use of the injection-molded article, any other injection molding method may be used, such as the in-the-mold method, gas press method, two-color molding method, sandwiching molding method, push-pull method or SCORIM.

The injection molding system used includes one of a general injection molder, a gas-assisted molder and an injection/compression molder, molds and their accessories, a mold temperature regulator, and a raw material dryer.

In order to prevent the resins from suffering thermal decomposition during molding in the injection cylinder, the molten resin temperature in the injection cylinder is preferably controlled in the range of between 170 and 210 degrees Celsius. At less than 170 degrees Celsius, the flame-retardant resin composition tends to melt incompletely. From such a resin composition, it is difficult to form a homogeneous injection-molded article. Over 210 degrees Celsius, the flame-retardant resin composition tends to hydrolyze to such an extent that its molecular weight decreases rather sharply.

The inorganic filler in the flame-retardant resin composition increases the chance of the flame-retardant, injection-molded article obtained developing flow marks, and the greater its content, the greater this chance. Thus, in order to prevent the flame-retardant, injection-molded article from developing flow marks, the flame-retardant resin composition has to be injected-molded at a speed substantially lower than the lowest speed at which a filler-free such flame-retardant resin composition can be injection-molded into a flame-retardant, injection molded article without developing flow marks.

For example, when a flame-retardant resin composition containing 15 percent by mass of talc as a filler was injection-molded in an injection molder having a plate mold having a thickness of 2 mm and screws having a diameter of 25 mm at a speed not exceeding 30 mm/second, the molded article was free of flow marks. When a filler-free resin composition was injection-molded, the injection-molded article obtained was free of flow marks even at the injection-molding speed of 50 mm/second.

If the flame-retardant, injection-molded article tends to develop shrink marks, the holding pressure and holding time should be increased. For example, depending on the shape and thickness of the injection-molded article, the holding pressure should be selected within the range of 30 to 100 MPa, and the holding time should be selected within the range of 1 to 15 seconds. Specifically, if the resin composition is to be formed into a plate-shaped article having a thickness of 2 mm, the holding time is preferably set at around 3 seconds.

If it is desired to obtain an amorphous, flame-retardant article by injection-molding the flame-retardant resin composition, it is necessary to shorten the cooling time in the molding cycle (comprising the steps of closing the mold, injection molding, holding pressure, cooling, opening the mold, and releasing the article). For this purpose, the mold for injection molding is preferably kept at as low a temperature as possible, typically at 15 to 55 degrees Celsius. A chiller may be used for this purpose. But in order to prevent shrinkage, warping and other deformation of the flame-retardant, injection-molded article, the mold temperature should be set at a higher level in the above temperature range.

In injection-molding the flame-retardant resin composition into the flame-retardant, injection-molded article, if it is desired to crystallize the flame-retardant, injection-molded article in the mold for injection molding, the molten resin composition is preferably charged into the mold for injection molding after heating the mold, and held therein for a predetermined period of time. The mold for injection molding is preferably heated to 60 to 130 degrees Celsius, more preferably 70 to 90 degrees Celsius. Below this range, an unduly long time will be needed for crystallization, and thus the entire cycle will be too long. Above this range, the injection-molded article may be deformed when released from the mold.

In order to further improve the heat resistance of the thus obtained flame-retardant, injection-molded article, the injection-molded article may be further crystallized or its crystallization may be promoted by subjecting the article to heat treatment. Such heat treatment is preferably conducted at 60 to 130 degrees Celsius, more preferably 70 to 90 degrees Celsius. If this temperature is below 60 degrees Celsius, crystallization will not progress sufficiently quickly. If higher than 130 degrees Celsius, the article tends to be deformed or shrink when cooled.

The heating time should be determined according to the composition of the flame-retardant, injection molded article and the heat treatment temperature. For example, if the heat treatment temperature is 70 degrees Celsius, its duration is preferably 15 minutes to 5 hours. If the heat treatment temperature is at 130 degrees Celsius, the duration of heat treatment is preferably 10 seconds to 30 minutes.

In order to crystallize an amorphous flame-retardant, injection molded article, or to further increase the crystallinity of an already crystallized such article, after injection molding, the formed article may be further heated by heating the mold for injection molding to an elevated temperature. For the same purpose, after taking the amorphous or crystallized injection-molded article out of the mold, the article may be exposed to hot air, steam, hot water, a far-infrared heater, or an IH heater for crystallization or to increase its crystallinity. During this step, the injection-molded article may not necessarily be fixed, but is preferably fixed in position in the metallic mold or resin mold for injection molding to prevent deformation of the article. For high productivity, heat treatment is carried out with the resin composition packaged.

Preferably, the heat-resistant, injection-molded article according to the present invention has a shock resistance not less than 5 kJ/m$^2$, more preferably not less than 10 kJ/m$^2$, as measured in an Izod impact test (at 23 degrees Celsius) under JIS K-7110. Below 5 kJ/m$^2$, the flame-retardant, injection-molded article will become brittle to such an extent that it cannot withstand practical use as an element of a household appliance.

Having excellent flame retardance, the flame-retardant, injection-molded article according to the present invention can replace any of existing resin parts of household appliances, office automation equipment, and other resin parts for which high flame retardance is required. Since the injection-molded article according to the invention is biodegradable after discarded, it is environment-friendly.

EXAMPLES

The below examples do not limit the invention whatsoever. Values and parameters shown in the below examples were measured or calculated as follows:

(1) Evaluation of Flammability (UL94)

Pellets obtained in Examples (of the invention) and Comparative Examples were injection-molded in an injection molder IS50E made by Toshiba Machine (screw diameter: 25 mm) into boards measuring 100 mm long, 10 mm wide and 2 mm thick. Flammability of these boards was evaluated, i.e. determined under Underwriters Laboratories safety specs UL 94. The meanings of the symbols ○ and X in the tables are as follows:

○: Extinguished itself within 10 seconds (practically acceptable)

X: Did not extinguish itself within 10 seconds and burned out (practically unacceptable)

(2) Decomposition Rate

The decomposition rate of the resin composition when the resin and the metallic hydroxide were kneaded together and then injection-molded was calculated from the weight-average molecular weight of the resin composition (Mw) before kneading, and Mw after injection molding, using the following equation. A practically acceptable decomposition rate was set at 10% or less.

Decomposition rate (%)={(Mw before kneading)−(Mw after injection molding)}/(Mw before kneading)×100

The Mw values were measured by gel permeation chromatography (GPC) under the following conditions:

solvent used: chloroform; concentration of the solution: 0.2 wt %/vol %; amount of solution injected: 200 microliters; flow rate of the solvent: 1.0 ml/minute; temperature of the solvent: 40 degrees Celsius The weight-average molecular weight of the lactic acid resin was calculated in terms of the weight-average molecular weight of the polystyrene. The weight-average molecular weights of standard polystyrenes used were 2000000, 430000, 110000, 35000, 10000, 4000 and 600.

(3) Determination of Izod Impact Strength

No. 1-A test pieces obtained from the boards of Examples (of the invention) and Comparative Examples were prepared under JIS K-7110 and tested for the Izod impact strength at 23 degrees Celsius. Any test piece having Izod impact strength of 5 kJ/m$^2$ was determined to be practically acceptable.

(4) Dimensional Stability

Figure 1B:
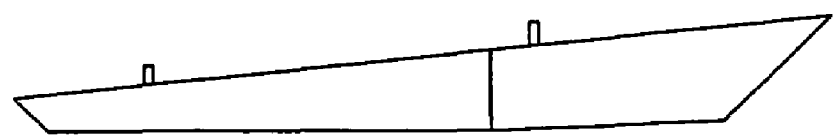
FIG. 1B is its front view.

Amorphous injection-molded articles in the shape of an electronic calculator as shown in FIG. 1 were prepared using an injection molder IS50E made by Toshiba Machine, under the following conditions:

cylinder temperature: 195 degrees Celsius; mold temperature: 25 degrees Celsius; injection pressure: 110 MPa; injection time: 1.5 seconds; holding pressure: 80 MPa; holding time: 3.0 seconds; back pressure: 10 MPa; and screw rpm: 110

After injection molding, conditioning of the articles was carried out in a test chamber (temperature: 23 degrees Celsius; relative humidity RH: 50%) and their dimensions X and Y in FIG. 1 were measured. The articles were then annealed at a predetermined temperature for a predetermined period of time. The annealing was carried out with the articles placed still in an oven kept at a steady temperature and humidity so that no undue loads act on the articles. Immediately after annealing, the articles were taken out and subjected to conditioning for 24 hours. After conditioning, dimensions X and Y were measured again to calculate the rate of shrinkage due to annealing. Dimensions X and Y were measured using a three-coordinate measuring machine. The meanings of the symbol ○, Δ and X in the tables are as follows:

○: The rates of shrinkage in the X and Y directions were both less than 1.0 percent Δ: One of the rates of shrinkage in the X and Y directions is between 1.0 and 2.0 percent X: The rates of shrinkage in the X and Y directions are both not less than 2.0%

(5) Molecular Weight Retention

The molecular weight retention due to the addition of the carbodiimide compound was calculated as follows. First, the boards of Examples of the invention and Comparative Examples were subjected to a wet heat test at 85 degrees Celsius and 80% RH for 10 hours. Then, their molecular weight retention rates after 10 hours were calculated based on the following equation.

Molecular weight retension (%)={(Mw after the wet heat test)/(Mw before the wet heat test)}×100

Example 1

NatureWorks 4031D made by Cargill Dow (L-lactic acid/D-lactic acid=98.5/1.5; weight-average molecular weight: 200000; hereinafter referred to as "PLA") as the lactic acid resin, and Pyrolyzer HG made by Ishizuka Glass Co., Ltd. (aluminum hydroxide coated with sol-gel Preglass; hereinafter referred to as "flame retardant 1") as the metallic hydroxide compound were dry-blended in the mass ratio of 100:50, and then compounded into pellets in a compact, same-direction twin-screw (40 mm in diameter) extruder made by Mitsubishi Heavy Industries.

The pellets obtained were injection-molded into boards measuring 100 mm long, 100 mm wide and 4 mm thick (for tests other than UL94 test) and boards measuring 100 mm long, 100 mm wide, and 2 mm thick (for UL94 test) using an injection molder IS50E (screw diameter: 25 mm) made by Toshiba Machine, under the following conditions:

1) Temperatures

Cylinder temperature: 195 degrees Celsius;

Mold temperature: 20 degrees Celsius

2) Injection Conditions

Injection pressure: 115 MPa

Holding pressure: 55 MPa

3) Measurement Conditions

Screw rpm: 65

Back pressure: 15 MPa

The boards obtained were placed still in a baking tester (DKS-5S made by Daiei Kagaku Seiki Mfg.) and subjected to heat treatment at 70 degrees Celsius for 3.5 hours. Flammability (UL94), decomposition rate and Izod impact strength were determined for each of the injection-molded articles obtained. They are shown in Table 1.

Example 2

After dry-blending PLA and flame retardant 1 in the mass ratio of 100:100, they were injection-molded. Their various properties were determined in exactly the same manner as in Example 1 and are shown in Table 1.

Example 3

After dry-blending PLA and flame retardant 1 in the mass ratio of 100:150, they were injection-molded. Their various properties were determined in exactly the same manner as in Example 1, and are shown in Table 1.

Example 4

PLA and Kisuma 5A made by Kyowa Chemical Industries (magnesium hydroxide treated with fatty acid; hereinafter referred to as "flame retardant 2") as the metallic hydroxide compound were dry-blended in the mass ratio of 100:100, and then injection-molded in the same manner as in Example 1. Their various properties were then determined in the same manner as in Example 1, which are shown in Table 1.

Example 5

PLA, Bionolle 1003 made by Showa High Polymer Co., Ltd. (polybutylene succinate; hereinafter referred to as "Bionolle") as the aliphatic polyester, of which Tg is 0 degrees Celsius or less and Tm is 100 degrees Celsius or more, Ecoflex made by BASF (comprising 24 mole percent of terephthalic acid, 26 mole percent of adipic acid, and 50 mole percent of 1,4-butanediol) as the aromatic aliphatic polyester, of which Tg is 0 degrees Celsius or less and Tm is 100 degrees Celsius or less, SG-95 made by Nippon Talc Co., Ltd. ("talc") as the inorganic filler, and flame retardant 1 were dry-blended in the mass ratio of 100:50:20:20:100, and then injection-molded in the same manner as in Example 1. Their various properties were determined in the same manner as in Example 1 and are shown in Table 1.

Example 6

After dry-blending PLA, Bionolle, Ecoflex, talc and flame retardant 1 in the mass ratio of 100:20:10:10:100, they were injection-molded. Their various properties were determined in exactly the same manner as in Example 1 and are shown in Table 1.

Example 7

After dry-blending PLA, Bionolle, Ecoflex, talc and flame retardant 1 in the mass ratio of 100:60:40:40:100, they were injection-molded. Their various properties were determined in exactly the same manner as in Example 1 and are shown in Table 1.

Example 8

After dry-blending PLA, and BF013ST (as a metallic hydroxide) treated with an epoxy silane coupling agent made by Nippon Light Metal Company, Ltd. (aluminum hydroxide; "flame retardant 3") in the mass ratio of 100:100, they were injection-molded. Their various properties were determined in exactly the same manner as in Example 1 and are shown in Table 1.

TABLE 1

| | | Example | | | | | | | |
|---|---|---|---|---|---|---|---|---|---|
| | | 1 | 2 | 3 | 4 | 5 | 6 | 7 | 8 |
| composition | PLA | 100 | 100 | 100 | 100 | 100 | 100 | 100 | 100 |
| | BIONOLLE | | | | | 50 | 20 | 60 | |
| | Ecoflex | | | | | 20 | 10 | 40 | |
| | talc | | | | | 20 | 10 | 40 | |
| | flame retardant 1 | 50 | 100 | 150 | | 100 | 100 | 100 | |
| | flame retardant 2 | | | | 100 | | | | |
| | flame retardant 3 | | | | 100 | | | | 100 |
| UL94 | | ○ | ○ | ○ | ○ | ○ | ○ | ○ | ○ |
| Decomposition rate (%) | | 2 | 4 | 9 | 5 | 3 | 4 | 2 | 3 |
| Izod impact strength (kJ/m$^2$) | | 10 | 7 | 5 | 7 | 16 | 14 | 24 | 8 |

Comparative Example 1

PLA alone was injection-molded in the same manner as in Example 1, its properties were determined in the same manner as in Example 1, which are shown in Table 2.

Comparative Example 2

After dry-blending PLA and flame retardant 1 in the mass ratio of 100:40, they were injection-molded. Their various properties were determined in exactly the same manner as in Example 1 and are shown in Table 2.

Comparative Example 3

After dry-blending PLA and flame retardant 1 in the mass ratio of 100:160, they were injection-molded. Their various properties were determined in exactly the same manner as in Example 1 and are shown in Table 2.

Comparative Example 4

After dry-blending PLA and aluminum hydroxide (made by Nacalai Tesque, Inc.; reagent) in the mass ratio of 100:100, they were injection-molded. Their various properties were determined in exactly the same manner as in Example 1 and are shown in Table 2.

Comparative Example 5

After dry-blending PLA and the same aluminum hydroxide as used in Comparative Example 4 in the mass ratio of 100:150, they were injection-molded. Their various properties were determined in exactly the same manner as in Example 1 and are shown in Table 2.

Comparative Example 6

After dry-blending PLA and the magnesium hydroxide (made by Nacalai Tesque, Inc.; reagent) in the mass ratio of 100:100, they were injection-molded. Their various properties were determined in exactly the same manner as in Example 1 and are shown in Table 2.

Comparative Example 7

After dry-blending PLA and the same magnexium hydroxide as used in Comparative Example 6 in the mass ratio of 100:150, they were injection-molded. Their various properties were determined in exactly the same manner as in Example 1 and are shown in Table 2.

TABLE 2

| | | Comp. Example | | | | | | |
|---|---|---|---|---|---|---|---|---|
| | | 1 | 2 | 3 | 4 | 5 | 6 | 7 |
| composition | PLA | 100 | 100 | 100 | 100 | 100 | 100 | 100 |
| | flame retardant 1 | | 40 | 160 | | | | |
| | aluminum hydroxide | | | | 100 | 150 | | |
| | magnesium hydroxide | | | | | | 100 | 150 |
| UL94 | | x | x | ○ | x | ○ | x | ○ |
| Decomposition rate (%) | | 1 | 1 | 12 | 62 | 88 | 60 | 85 |
| Izod impact strength (kJ/m$^2$) | | 12 | 10 | 3 | *1 | *1 | *1 | *1 |

*1: Because the formed article was brittle, it was impossible to test with an Izod impact tester.

Comparative Example 8

After dry-blending PLA, Bionolle, Ecoflex and flame retardant 1 in the mass ratio of 100:50:20:100, they were injection-molded. Their various properties were determined in exactly the same manner as in Example 1 and are shown in Table 3.

TABLE 3

| | | Example 5 | Comp. Example 8 |
|---|---|---|---|
| composition | PLA | 100 | 100 |
| | BIONOLLE | 50 | 50 |
| | Ecoflex | 20 | 20 |
| | talc | 20 | |
| | flame retardant 1 | 100 | 100 |
| Dimensional stability | | ○ | x |

Example 9

After dry-blending PLA, flame retardant 1, and Stabaxol P made by Rhein Chemie Rheinau GmbH (polycarbodiimide) as the carbodiimide compound in the mass ratio of 100:100:3, they were injection-molded in the same manner as in Example 1. The molecular weight retention rate was determined together with the injection-molded article of comparative example 2. The results are shown in Table 4.

TABLE 4

|  |  | Example 9 | Comp. Example 2 |
|---|---|---|---|
| composition | PLA | 100 | 100 |
|  | flame retardant 1 | 100 | 100 |
|  | carbodiimide compound | 3 |  |
| molecular weight retention rate (%) |  | 93 | 20 |

What is claimed is:

1. A flame-retardant resin composition comprising a resin composition mainly comprising a lactic acid resin, and 50 to 150 parts by mass of a surface-treated metallic hydroxide based on 100 parts by mass of said lactic acid resin, and further comprising a carbodiimide compound.

2. The flame-retardant resin composition of claim 1 wherein said metallic hydroxide is surface-treated with a surface treating agent selected from the group consisting of higher fatty acids, silane coupling agents, titanate coupling agents, silicone compounds and synthetic resins.

3. The flame-retardant resin composition of claim 1 further comprising an inorganic filler.

4. The flame-retardant resin composition of claim 2 further comprising an inorganic filler.

5. A flame-retardant, injection-molded article formed by injection-molding the flame-retardant resin composition of claim 1.

6. A flame-retardant, injection-molded article formed by injection-molding the flame-retardant resin composition of claim 2.

7. The flame-retardant, injection-molded article of claim 6 which is crystallized at a temperature of from 60 to 130 degrees Celsius.

8. A flame-retardant, injection-molded article formed by injection-molding the flame-retardant resin composition of claim 3.

9. A flame-retardant resin composition comprising a resin composition mainly comprising a lactic acid resin, and 50 to 150 parts by mass of a surface-treated metallic hydroxide based on 100 parts by mass of said lactic acid resin, wherein said resin composition is a mixture of said lactic acid resin, a first aliphatic polyester other than a lactic acid resin or aromatic aliphatic polyester, said first aliphatic polyester or aromatic aliphatic polyester having a glass transition temperature Tg not exceeding 0 degrees Celsius and a crystalline melting temperature Tm of not less than 100 degrees Celsius, and a second aliphatic polyester other than a lactic acid resin or aromatic aliphatic polyester, said second aliphatic polyester or aromatic aliphatic polyester having a glass transition temperature Tg not exceeding 0 degrees Celsius and a crystalline melting temperature Tm of less than 100 degrees Celsius.

10. The flame-retardant resin composition of claim 9 further comprising a carbodiimide compound.

11. The flame-retardant resin composition of claim 9 further comprising an inorganic filler.

12. A flame-retardant, injection-molded article formed by injection-molding the flame-retardant resin composition of claim 9.

13. A flame-retardant resin composition comprising a resin composition mainly comprising a lactic acid resin, and 50 to 150 parts by mass of a surface-treated metallic hydroxide based on 100 parts by mass of said lactic acid resin, wherein said resin composition is a mixture of said lactic acid resin, a first aliphatic polyester other than a lactic acid resin or aromatic aliphatic polyester, said first aliphatic polyester or aromatic aliphatic polyester having a glass transition temperature Tg not exceeding 0 degrees Celsius and a crystalline melting temperature Tm of not less than 100 degrees Celsius, and a second aliphatic polyester other than a lactic acid resin or aromatic aliphatic polyester, said second aliphatic polyester or aromatic aliphatic polyester having a glass transition temperature Tg not exceeding 0 degrees Celsius and a crystalline melting temperature Tm of less than 100 degrees Celsius, and wherein said metallic hydroxide is surface-treated with a surface treating agent selected from the group consisting of higher fatty acids, silane coupling agents, titanate coupling agents, silicone compounds and synthetic resins.

* * * * *